(12) United States Patent
Peters

(10) Patent No.: US 7,725,815 B2
(45) Date of Patent: *May 25, 2010

(54) METHOD AND SYSTEM FOR ORDERED RESIZING COLUMNS IN A TABLE

(75) Inventor: Johan C. Peters, Sankt Leon-Rot (DE)

(73) Assignee: SAP AG, Walldorf (DE)

( * ) Notice: Subject to any disclaimer, the term of this patent is extended or adjusted under 35 U.S.C. 154(b) by 1166 days.

This patent is subject to a terminal disclaimer.

(21) Appl. No.: 11/301,972

(22) Filed: Dec. 12, 2005

(65) Prior Publication Data
US 2007/0136654 A1 Jun. 14, 2007

(51) Int. Cl.
*G06F 17/00* (2006.01)
(52) U.S. Cl. ...................................... 715/227; 715/245
(58) Field of Classification Search ................. 715/764, 715/227, 228, 243, 244, 245, 246, 247, 273, 715/793, 796, 810, 815, 772
See application file for complete search history.

(56) References Cited

U.S. PATENT DOCUMENTS

| | | | | |
|---|---|---|---|---|
| 4,484,826 A | * | 11/1984 | Horn et al. ................. | 400/279 |
| 5,588,099 A | * | 12/1996 | Mogilevsky et al. ........ | 715/273 |
| 5,768,606 A | * | 6/1998 | Sharp ......................... | 715/212 |
| 6,144,974 A | * | 11/2000 | Gartland ..................... | 715/205 |
| 6,313,848 B1 | * | 11/2001 | Hoag .......................... | 345/684 |
| 6,397,219 B2 | * | 5/2002 | Mills ........................... | 707/10 |
| 6,639,611 B1 | * | 10/2003 | Leduc ......................... | 715/764 |
| 6,839,575 B2 | * | 1/2005 | Ostergaard ................. | 455/566 |
| 6,981,209 B1 | * | 12/2005 | Parikh et al. ................. | 715/212 |
| 7,010,779 B2 | * | 3/2006 | Rubin et al. ................ | 717/106 |
| 7,177,488 B2 | * | 2/2007 | Berkner et al. ............. | 382/298 |
| 7,296,220 B2 | * | 11/2007 | Yalovsky et al. .................... | 1/1 |
| 7,428,709 B2 | * | 9/2008 | Forstall et al. .............. | 715/784 |
| 7,447,987 B2 | * | 11/2008 | Sauermann .................. | 715/212 |
| 7,461,353 B2 | * | 12/2008 | Rohrabaugh et al. ........ | 715/815 |
| 2002/0013165 A1 | * | 1/2002 | Ostergaard ................... | 455/566 |
| 2002/0147725 A1 | * | 10/2002 | Janssen et al. .............. | 707/100 |
| 2004/0145593 A1 | * | 7/2004 | Berkner et al. .............. | 345/619 |
| 2004/0205676 A1 | * | 10/2004 | Bennett ....................... | 715/538 |
| 2005/0071755 A1 | * | 3/2005 | Harrington et al. .......... | 715/511 |
| 2007/0156712 A1 | * | 7/2007 | Wasserman et al. ......... | 707/100 |

(Continued)

OTHER PUBLICATIONS

Artail, A., et al, "Device-Aware Desktop Web Page Transformation for Rendering on Handhelds", Personal and Ubiquitous Computing, vol. 9, Issue 6, Nov. 2005, pp. 368-380.*

*Primary Examiner*—Laurie Ries
(74) *Attorney, Agent, or Firm*—Kenyon & Kenyon LLP

(57) ABSTRACT

A method and system is provided for resizing columns in a table when a table width is changed from a current table width to a new table width. The table may contain data and may be displayed to a user. The table may be resized responsively to the user's inputs or other conditions. A new column width is determined for each column in the table based on a column minimum width and a column maximum width associated with each column. Column minimum widths and column maximum widths may be selected to enhance user comprehension of data displayed in the table. Each column may be associated with a variable representing an order, and the columns may be resized in ascending sequence based on the order variable.

31 Claims, 7 Drawing Sheets

U.S. PATENT DOCUMENTS

| | | | |
|---|---|---|---|
| 2007/0180386 A1* | 8/2007 | Ballard et al. | 715/744 |
| 2008/0104091 A1* | 5/2008 | Chin | 707/100 |
| 2008/0141167 A1* | 6/2008 | Kubo et al. | 715/796 |
| 2008/0282189 A1* | 11/2008 | Hofmann et al. | 715/793 |
| 2008/0307357 A1* | 12/2008 | Gould et al. | 715/810 |
| 2009/0024951 A1* | 1/2009 | Zeringue et al. | 715/772 |
| 2009/0055775 A1* | 2/2009 | Suzuki | 715/810 |

\* cited by examiner

1000

1000

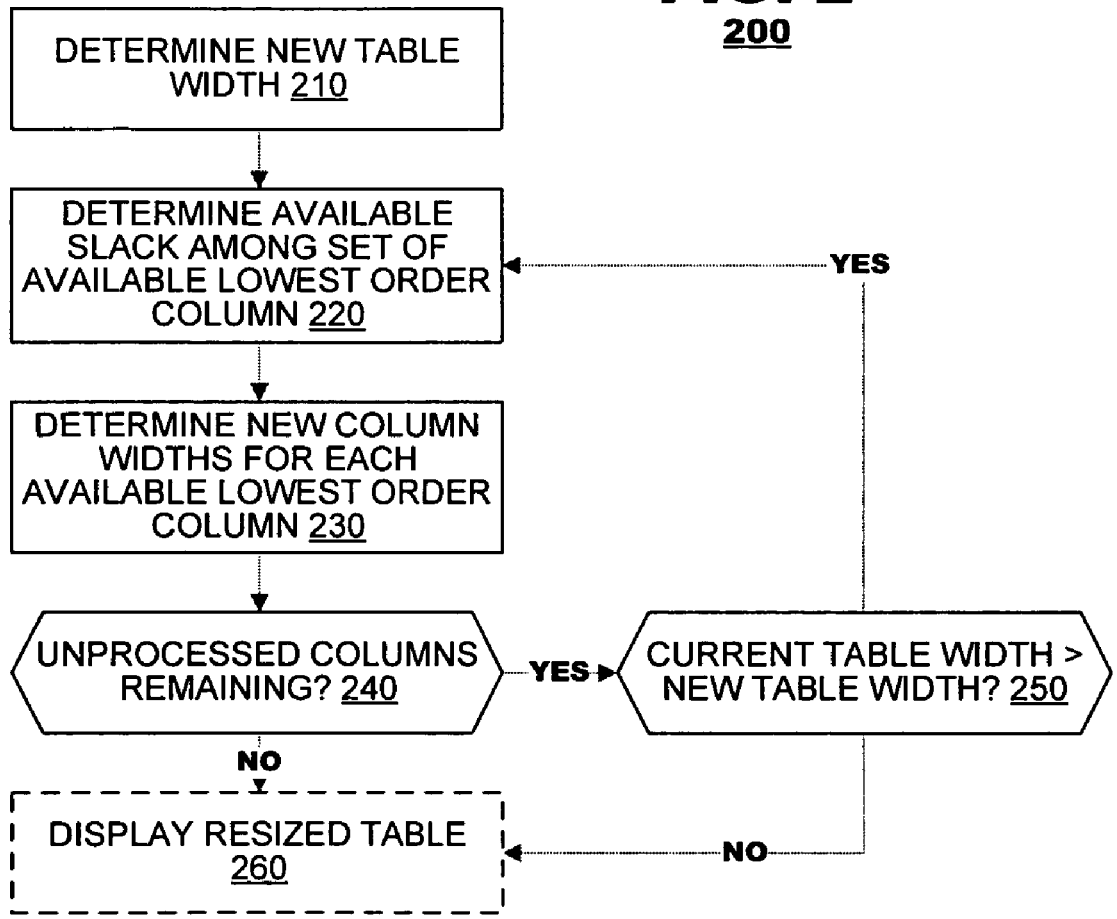

300

400

500

<u>600</u>

| Field | Column Max | Column Min | Order |
|---|---|---|---|
| Name | 100 | 60 | 0 |
| Telephone | 100 | 90 | 2 |
| Cell Phone | 100 | 90 | 2 |
| Address | 300 | 60 | 1 |

602 — (rows); 604 — (each row)

<u>610</u>

612  614  616  618
| Name | 100 | 60 | 0 | —604'

METHOD AND SYSTEM FOR ORDERED RESIZING COLUMNS IN A TABLE

BACKGROUND

Tabular presentation of data in columns is a conventional technique for presenting data in computer applications. Each column may be associated with a column width, and the table may be associated with a table width. Table widths can vary when tabular data is displayed via a user interface that has no fixed width. For example, when displaying a table in a web page via a web browser, the width of an application window assigned to the browser can be controlled by a user. Similarly, table widths may be changed to accommodate different printing scenarios. If a table is printed to a page in portrait orientation, the table width is one size (e.g., 6.5 inches). If the same table is printed in landscape orientation, the table width may be a different size (e.g., 9 inches). The table width also may vary to accommodate changes in paper sizes (legal size, A4 size).

In many applications, such as spreadsheets, word processors and web pages, column widths are defined statically. The applications' user interfaces do not naturally scale the column widths to fit changes in on screen display widths or in rendered display widths (such as on paper). Some rendering systems for web pages may scale all column widths within a table equally in response to changes in the width of the application window. If an application window shrinks to 80% of its former width, all column widths in the table shrink by a corresponding percentage.

Various computing platforms also limit the amount of data that can be displayed intelligibly. A Personal Digital Assistant (PDA) typically has much less screen area than a personal computer (PC). Therefore, different display controls govern from device to device.

Columns in a table may be resized to a width too small or too large to properly display data. Some types of data should be displayed in columns with specific widths for perceptual quality. For example, if a column displaying a telephone number had its width reduced to the point that trailing telephone digits were truncated, the displayed information would be useless. Alternatively, if the column width increased so that the column width for a telephone number could be increased beyond the size that is necessary to display all digits of the telephone number, providing such an increase in width would be wasteful because there is no other useful information to display. Similarly, it is almost useless to display half a check-box. Information in a check-box or a telephone number column is useful only if the data is displayed in its entirety.

For other types of data, it is possible to shrink the width of a tabular column in which it is displayed without an appreciable loss in perceptual quality. A user may be able to review a portion of the data that remains displayed in the smaller column and perceive useful information. For example, one might gleam useful information from a truncated display of a name or a description.

Therefore, there is a need in the art for a control system for presentation of tabular data that is sensitive to different data types and ensures, where possible, that certain minimum or maximum column widths are maintained. There is a further need in the art for such a control system that is cognizant of different priorities in display width that are assigned to different types of data displayed in a table.

BRIEF DESCRIPTION OF THE DRAWINGS

FIG. 2 illustrates an example procedure for resizing a table, in accordance with a second example embodiment of the present invention.

DETAILED DESCRIPTION

Embodiments of the invention provide a scheme for resizing column widths dynamically in response to changes in a table width. Each column may have a minimum column width, a maximum column width and a priority, defined therefor. When the table might be displayed, a user interface may permit custom width for display of the table. The scheme dynamically changes the width of the columns therein by: determining whether the display width is less than the sum of the minimum widths defined for the columns, and if so, allocating display widths to each of the columns equal to their minimum widths in orders determined by each column's relative priority. If the display width of the table exceeds the sum of the minimum width of all the columns, the scheme assigns minimum widths to each of the columns and adds to the columns some portion of the slack—a difference between the sum and the table display width—in order of priority. The table may then be rendered for display using the table widths so calculated.

The scheme may be re-invoked anytime a display width of the table is changed, for example, whenever an application window in which the table sits is resized. In effect, when the width of the table is changed, each column width may be resized. Each column width is kept larger than or equal to the column minimum width and smaller than or equal to the column maximum width.

Figure 1:
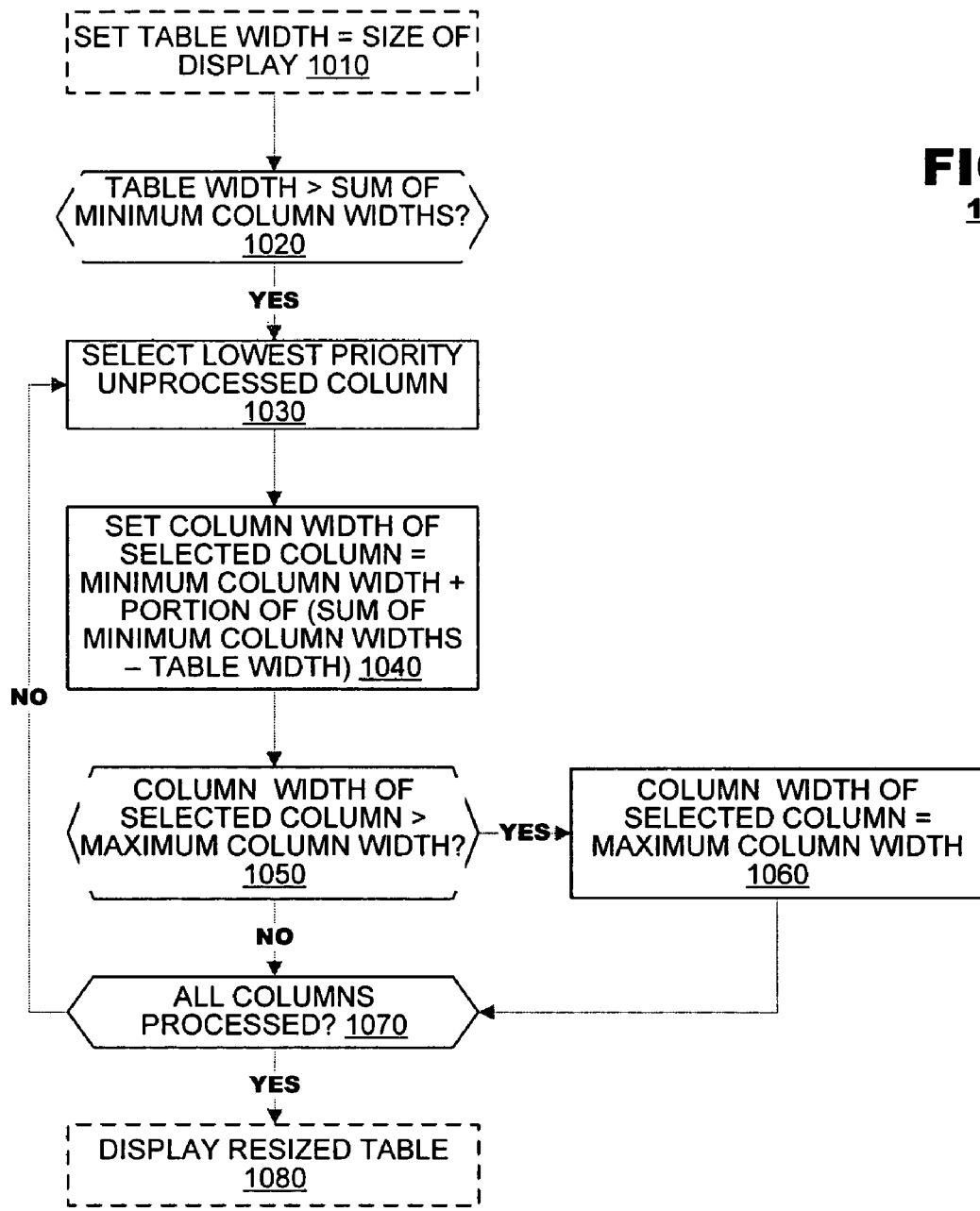
FIG. 1 illustrates an example procedure for resizing a table, in accordance with a first example embodiment of the present invention.
Figures 6A, 6B:
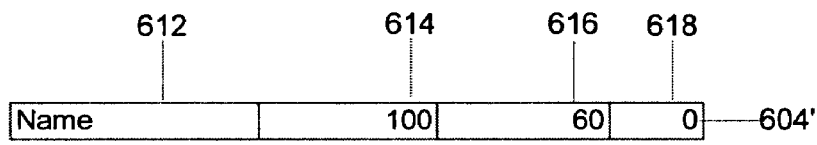
FIG. 6a illustrates an example column properties table, in accordance with an example embodiment of the present invention.
FIG. 6b illustrates an example column properties table, in accordance with an example embodiment of the present invention.

FIG. 1 illustrates an example procedure for resizing a table, in accordance with a first example embodiment of the present invention. The table may be associated with a table width and include at least one column. Each column may be associated with a column width. The table width may be a sum of column widths of the columns in the table. Each column may also be associated with a maximum column width, a minimum column width and a column order. For example, the column order may be indicate the priority of the column when resizing occurs. For example, the column order may be set by the application programmer, automatically determined based on a data type stored in the column or determined in another manner. For example, properties associated with each column may be stored in a column properties table, as illustrated in FIGS. 6a and 6b.

In 1010, the procedure may optionally set the table width. For example, the table width may be set as a function of a size of a display where the table is rendered. Alternatively, the table width may optionally be set equal to a size of an application window in which the table is rendered. Alternatively, the table width may optionally be set equal to a user input.

In 1020, the procedure may test whether the table width is greater than a sum of minimum column widths. If no, no resizing may be necessary and the procedure may end. If yes, the procedure may proceed to 1030.

In 1030, a lowest priority unprocessed column may be selected for processing. For example, priority may be determined by the column order associated with each column. In one example embodiment, the column order may be positive integers. In this example embodiment, low order columns may be processed first. That is, columns with high orders may be resized last, thereby maintain their widths as long as possible.

In 1040, the column width of the selected column may be set to equal the minimum column width plus a portion of a difference between the sum minimum column widths and the table width.

In 1050, the procedure may test whether the column width of the selected column set in 1040 is greater than the maximum column width associated with the column. If yes, the procedure may proceed to 1060. If no, the procedure may proceed to 1070.

In 1060, the procedure may set the column width of the selected column equal to the maximum column width. For example, this may prevent a column's column width from exceeding its associated maximum column width.

In 1070, the procedure may test whether all columns have been processed. If yes, the procedure may proceed to 1080. Alternatively, the procedure may end. If no, the procedure may proceed to 1030, where another unprocessed column may be selected for processing.

In 1080, the procedure may optionally display the table with each column associated with its column width set in 1040.

Figure 1A:
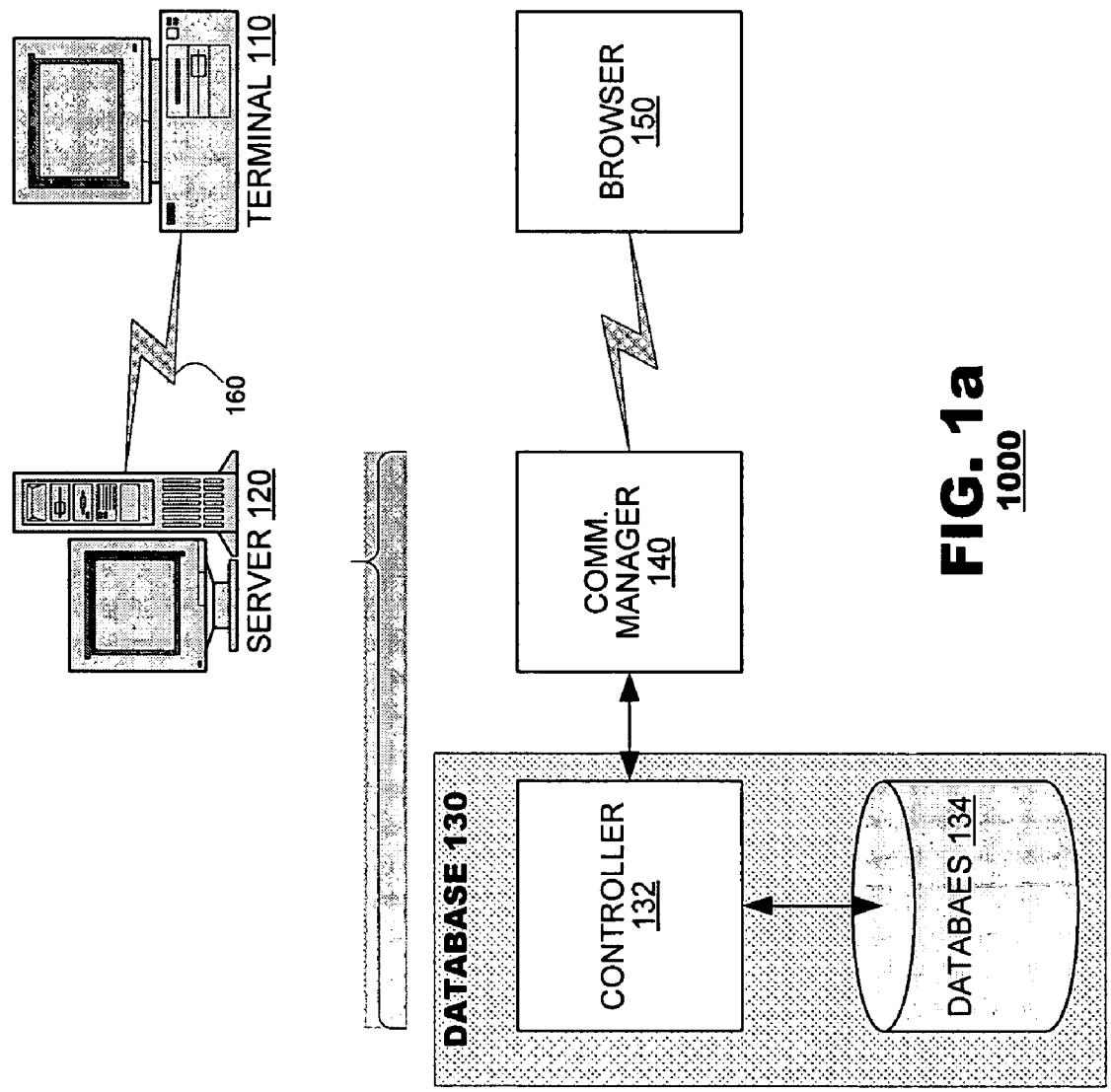
FIG. 1a illustrates an example system architecture configured to execute an example embodiment of the present invention.

FIG. 1a illustrates an example system architecture configured to execute an example embodiment of the present invention. A terminal 110 may be available to a user. The terminal 110 may include a display screen, an input device such as a keyboard or a mouse, and a network connection. For example, the terminal 110 may be a personal computer, a laptop computer, a tablet computer, a personal digital assistant (PDA) or a wireless device such as a cell phone.

The terminal 110 may be configured to execute various application programs such as browsers, word processing programs, spreadsheet programs, enterprise management applications and the like. For example, a browser 150, such as an Internet web browser may be executed on the terminal 110. These applications may display data tables as part of their ordinary operations. For example, the browser 150 may be configured to display data from a database and accept user input.

A server 120 may be available. In addition, other servers may be available (not depicted.) The server 120 may execute software configured to support a database system, as discussed below. The server 120 may include a processor, a database system 130 and a network connection.

There may be a communication link 160 between the terminal 110 and the server 120. For example, the communication link may operably connect the network connection of the terminal 110 and the network connection of the server 120. For example, the communication link 160 may be over the Internet, over a virtual private network, over an Ethernet network, or another conventional network.

The database system 130 may be configured to execute on the server 120. The database system 130 may include a communications manager 140. The communication manager 140 may be configured to execute on the server 120 and to interface with the browser 150 executing on the terminal 110 over the communication link 160. The communication manager 140 may support interactive communications between the browser 150 and the database system 130.

The database system 130 may include a database 134, which may store data. For example, the database 134 may be a relational database. The database system 130 may include a database controller 132. The database controller 132 may be configured to interface between the communication manager 140 and the database 134. For example, the database 134 may be stored on a series of hard disks local to the server 120.

The communication manager 140 may process user requests submitted from the terminal 110 through browser 150. Such requests may be processed through the communication manager 140 and the database controller 130 and may include retrieval of data located in database 134. The data may be returned to the browser 150 and displayed for the user on the browser 150. The user may also submit requests to change viewing parameters, such as resizing the table as displayed on the browser 150.

Figure 3:
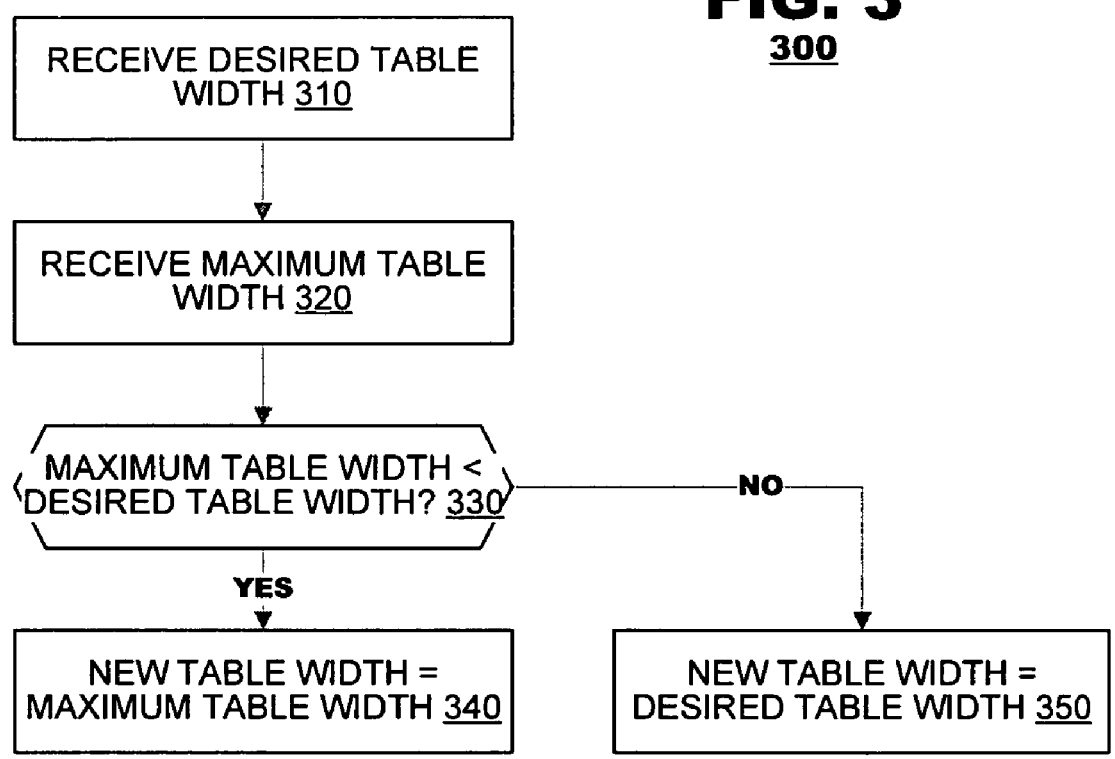
FIG. 3 illustrates an example procedure for determining a new table width, in accordance with a second example embodiment of the present invention.

FIG. 2 illustrates an example procedure for resizing a table, in accordance with a second example embodiment of the present invention. In 210, a new table width may be determined. For example, the new table width may be determined by a procedure as depicted in FIG. 3.

For example, table and column widths may be a number of characters. A column width may be a number of characters that can fit in the column. Likewise, a table width may be a number of characters that can fit within the table. Alternatively, table and column widths may be a number of pixels or any other display dependent or absolute unit of measure.

Figure 4:
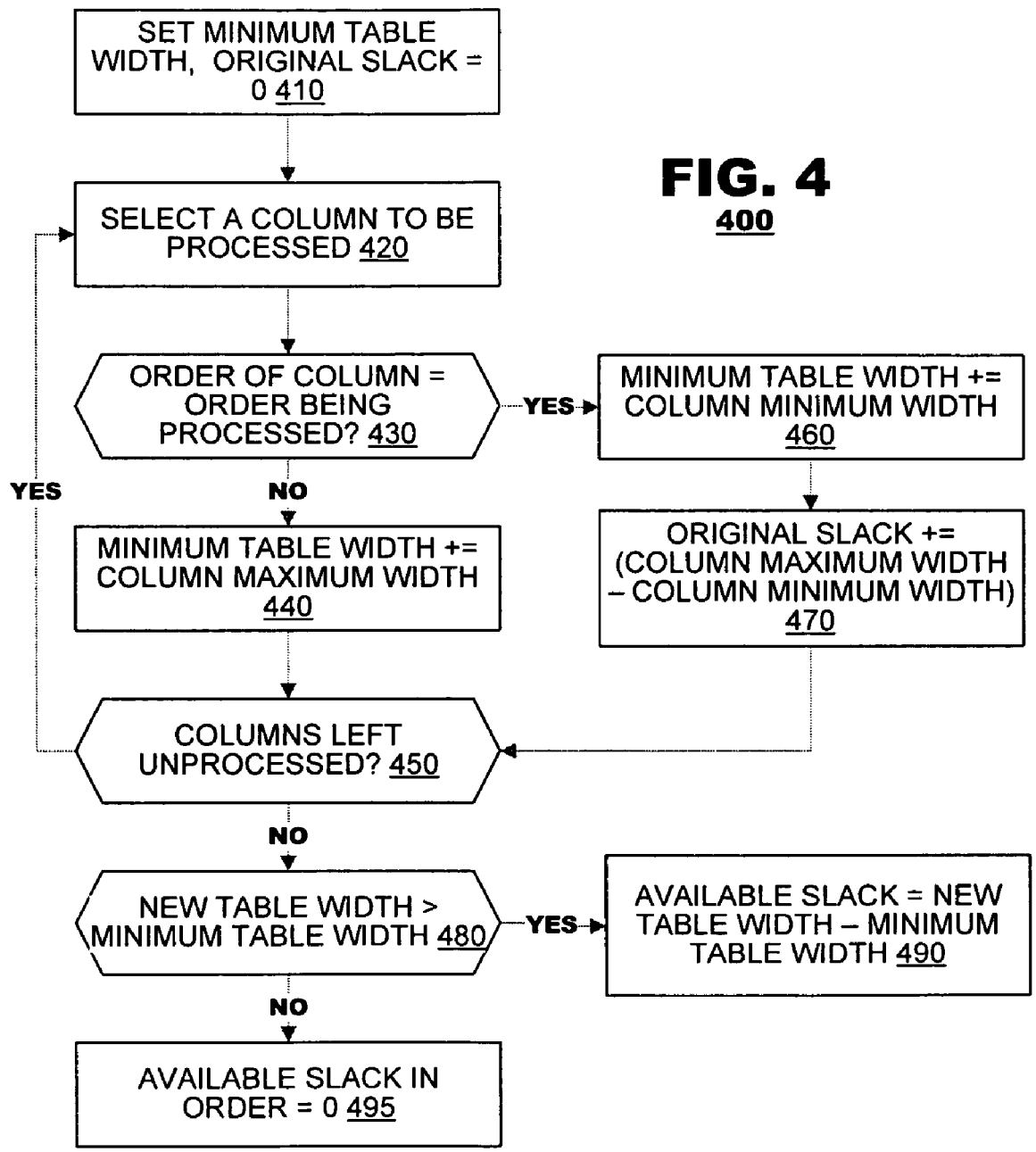
FIG. 4 illustrates an example procedure for determining an available slack among a set of available lowest order columns, in accordance with a second example embodiment of the present invention.

In 220, an available slack among a set of available lowest order columns may be determined. For example, the available slack among the set of available lowest order columns may be determined by a procedure as depicted in FIG. 4.

Figure 5:
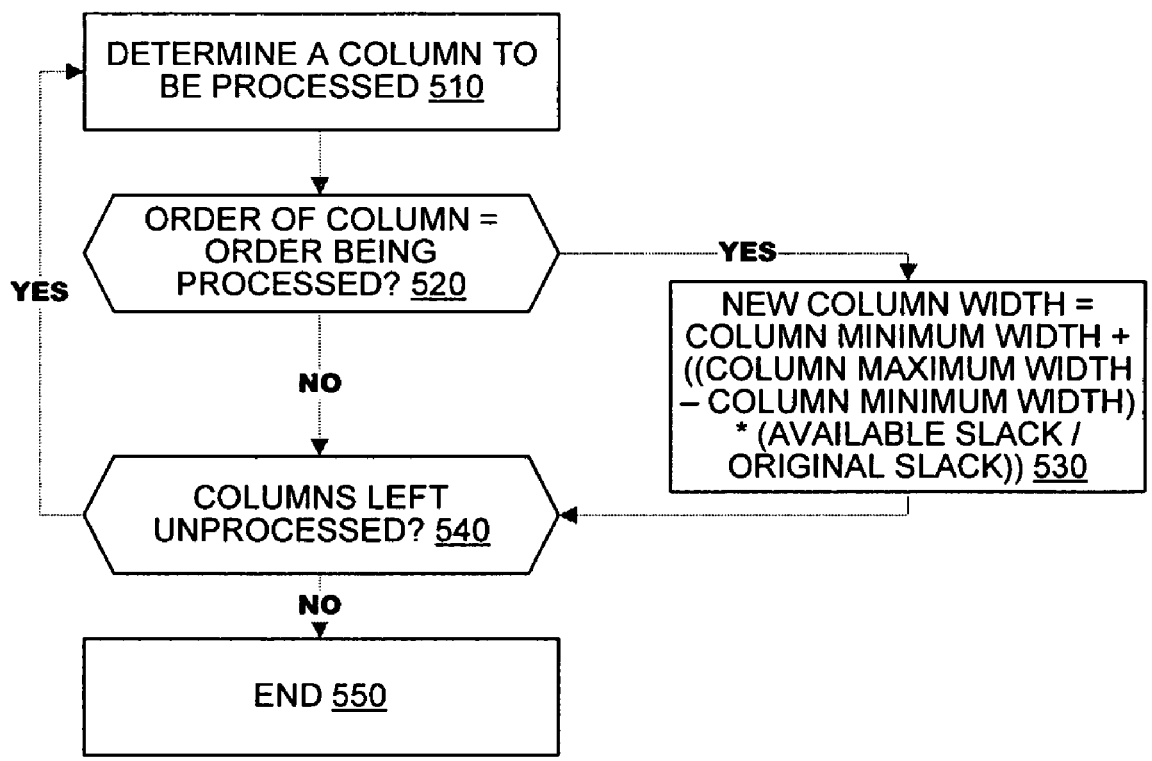
FIG. 5 illustrates an example procedure for determining new widths for a set of lowest order columns, in accordance with a second embodiment of the present invention.

In 230, a new column width may be determined for each available lowest order column. For example, the new columns widths may be determined by a procedure as depicted in FIG. 5.

In 240, the procedure may test whether there are unprocessed columns remaining. If unprocessed columns remain, the procedure proceeds to 250. If no unprocessed columns remain, the procedure proceeds to 260.

In 260, the table may be displayed with the new column widths set in 230. For example, the table may be displayed to a user on a browser as depicted in FIG. 1. Alternatively, the procedure may end in 260.

In 250, the procedure may test whether a current table width is greater the new table width. If yes, the procedure continues to 220. If no, the procedure continues to 260.

FIG. 3 illustrates an example procedure for determining a new table width, in accordance with a second example embodiment of the present invention. In 310, the procedure may receive a desired table width. The desired table width may be a new width the table should be resized to. For example, the desired table width may be received from a user through a browser as depicted in FIG. 1, reflecting a table width desired by the user.

In 320, a maximum table width may be received. For example, the maximum table width may be an original width of the table. Alternatively, the maximum table width may be a pre-defined variable. For example, the maximum table width may be a sum of column maximum widths stored in a column properties table as depicted in FIG. 6a. The maximum table width may be different from the desired table width received in 310.

In 330, the procedure may compare the maximum table width with the desired table width. For example, the maximum table width may be a number of characters that can fit inside the table, and the desired table width may be a number of characters that can fit inside the desired table. In this example, the two numbers are compared. If the maximum table width is less than the desired table width, the procedure proceeds to 340. If the maximum table width is greater than the desired table width, the procedure proceeds to 350.

In 340, the new table width is set to equal the maximum table width. Thus, the new table width cannot exceed the maximum table width.

In 350, the new table width is set to equal the desired table width.

FIG. 4 illustrates an example procedure for determining an available slack among a set of available lowest order columns, in accordance with a second example embodiment of the present invention. In 410, a variable representing the minimum table width may be set to zero. A variable representing an original table slack among the set of available lowest order columns may also be set to zero.

In 420, a column may be selected for processing. The column may be selected from the columns in the table. For example, the columns may be processed in ascending order. In this example, columns may be numbered from left to right in ascending order. Therefore, the columns may be processed from left to right.

In 430, an order associated with the column may be tested against an order of columns being processed. For example, the order of columns being processed may be an order of a lowest order of columns that have not been processed. In this example, columns may be processed from the lowest order to the highest order. For example, an order may be an integer associated with each column. In this example embodiment, columns with the lowest order are processed first. More than one column may be associated with the same order. Thus, a set of columns associated with the same order may include one or more columns.

If the column tested has an order equal to the order of columns being processed, the procedure proceeds to 460. Otherwise, the procedure proceeds to 440.

In 460, the variable representing the minimum table width may be incremented by a column minimum width of the column being processed.

In 470, the variable representing the original table slack among the set of available lowest order columns may be incremented by a difference between a column maximum width and a column minimum width associated with the column being processed. The procedure proceeds to 450.

In 440, the column being processed is not within the set of columns with the lowest order that have not yet been processed. The variable representing the minimum table width is incremented with by a column maximum width associated with the column being processed. The procedure proceeds to 450.

In 450, the procedure may test whether there are unprocessed columns remaining in the set of available lowest order columns. If unprocessed columns remain, the procedure proceeds to 420 where another column is selected for processing. If no unprocessed columns remain, the procedure proceeds to 480.

In 480, the procedure may test whether a new table width is greater than the variable representing the minimum table width. If yes, the procedure proceeds to 490. If no, the procedure proceeds to 495.

In 490, the available slack among the set of available lowest order columns is set to equal a difference between the new table width and the minimum table width.

In 495, the available slack among the set of available lowest order columns is set to equal zero.

FIG. 5 illustrates an example procedure for determining new widths for a set of lowest order columns, in accordance with a second embodiment of the present invention. In 510, a column may be selected for processing. The column may be selected from the columns in the table. For example, the columns may be processed in ascending order. In this example, columns may be numbered from left to right in ascending order. Therefore, the columns may be processed from left to right.

In 520, an order associated with the column may be tested against an order of columns being processed. For example, the order of columns being processed may be an order of a lowest order of columns that have not been processed. In this example, columns may be processed from the lowest order to the highest order. For example, an order may be an integer associated with each column. In this example embodiment, columns with the lowest order are processed first. More than one column may be associated with the same order. Thus, a set of columns associated with the same order may include one or more columns.

If the column tested has an order equal to the order of columns being processed, the procedure proceeds to 530. Otherwise, the procedure proceeds to 540.

In 530, a new column width may be set for the column selected for processing. The column width may be set to equal to a difference between the column maximum width and the column minimum width multiplied by the quotient of the available slack among the set of available lowest order columns and original table slack among the set of available lowest order columns plus the column minimum width.

For example, the available slack among the set of available lowest order columns may be calculated by a procedure as depicted in FIG. 4. For example, the original table slack among the set of available lowest order columns may be calculated by a procedure as depicted in FIG. 4.

It will be appreciated that a column minimum width may equal zero. If a column minimum width associated with a column is zero, the new column width may be set to zero if the available slack among the set of available lowest order columns is equal zero. In effect, low priority columns can be set to not be displayed if there is insufficient room in the table.

In 540, the procedure may test whether there are unprocessed columns remaining. If unprocessed columns remain, the procedure proceeds to 510 where another column is selected for processing. If no unprocessed columns remain, the procedure proceeds to 550.

The procedure ends in 550.

FIG. 6a illustrates an example column properties table, in accordance with an example embodiment of the present invention. The column properties table 602 may include a plurality of records 604, each record 604 representing one column and a column maximum width and a column minimum width associated with the column.

It will be appreciated that the column properties table 602 may be stored in a variety of ways accessible to a server. For example, it may be stored as a tab delimited or comma delimited flat file, in a relational database or another storage method accessible to a server.

FIG. 6b illustrates an example column properties table, in accordance with an example embodiment of the present invention. Each column properties table entry may be a record 604'. Each record 604' may contain a variety of information, such as a Field 612. For example, Field 612 may contain a field name associated with each column. The field name may be a string description of data stored in the column. For example, the field name may be "Name", indicating the column stores a string representing names of people.

The record 604' may also include a Column Max 614. The Column Max 614 may be a value indicating a column maximum width. For example, the Column Max 614 may be a number indicating how many characters or pixels wide the column may be.

The record 604' may also include a Column Min 616. The Column Min 616 may be a value indicating a column minimum width. For example, the Column Min 616 may be a number indicating how many characters or pixels wide the column may be.

The record 604' may also include a column Order 618. The Order 618 may be a number representing the column's order when the columns of the table are being resized. For example, the Order 618 may be an integer. For example, a column associated with a low rank may be resized smaller first and resized larger last compared to a column associated with a higher rank.

For example, if the table associated with the example columns properties table depicted in FIG. 6a is resized smaller, the Name field will be resized smaller first, then the Address field, and finally the Telephone and Cell Phone fields together. For example, a table can be resized smaller by providing a desired table width that is smaller than a current width of the table.

Similarly, a table can be resized larger by providing a desired table width that is larger than a current width table. In the table associated with the example columns properties table depicted in FIG. 6a, the Telephone and Cell Phone fields will be expanded together first, followed by the Address field, followed by the Name field.

I claim:

1. A display method for displaying table data in a computing device, columns of the table having been assigned relative priorities between them, the method comprising:
    comparing a desired table width to a sum of minimum permissible display widths for all columns of the table;
    if the table width exceeds the sum of minimum widths, then in an order determined by a relative priority among the columns:
        assigning a new display width to each respective column according to the relative priority and equal to a minimum width defined for the column and a portion of a slack,
        wherein the new display width assigned to each column does not exceed a maximum width previously defined for the respective column; and
    displaying the table using the assigned display widths of the columns.

2. The method of claim 1, wherein the table width is determined by a size of a display on which the table is rendered.

3. The method of claim 1, wherein the table width is determined from a size of an application window in which the table is rendered.

4. The method of claim 3, further comprising:
    repeating the method when the application window is resized.

5. The method of claim 1, wherein the table width is determined from a user input.

6. The method of claim 1, wherein the minimum width, the maximum width and the relative priority of each column is stored in a column properties database.

7. The method of claim 1, wherein the device is a personal computer.

8. The method of claim 1, wherein the device is a personal digital assistant.

9. The method of claim 1, wherein the device is a tablet computer.

10. The method of claim 1, wherein the device is a cellular phone.

11. The method of claim 1, wherein the slack is the difference between the sum of the minimum widths and the table width.

12. The method of claim 11, wherein an original slack represents the slack being initialized to zero.

13. The method of claim 12, wherein the original slack is incremented by a difference between the maximum column width and the minimum column width.

14. The method of claim 13, wherein an available slack is determined for all columns of the table in order to resize the table.

15. The method of claim 14, wherein the available slack is determined as a difference between the display width and the minimum column width.

16. The method of claim 15, wherein the portion of the slack is equal to:
    a difference between the minimum and maximum column width multiplied by a quotient of the available slack and the original slack.

17. The method of claim 1, wherein the relative priority is determined by column orders, the column orders being represented by positive integers varying from low to high.

18. The method of claim 17, wherein the columns having low column orders are assigned new display widths first, the width of columns having high column orders being maintained as long as possible.

19. The method of claim 18, wherein if the available slack is zero, the columns having high column orders may be set to not be displayed if the table has insufficient available space.

20. The method of claim 18, wherein the new display width is equal to:
    a sum of the minimum column width and difference between the minimum and maximum column width multiplied by a quotient of an available slack for the low order columns and an original slack for the low order columns.

21. A system of resizing columns in a table, comprising:
    a terminal;
    a browser configured to execute on the terminal; and
    a processor, the processor configured to:
        compare a desired table width to a sum of minimum permissible display widths for all columns of the table;
        if the table width exceeds the sum of minimum widths, then in an order determined by a relative priority among the columns:

assign a new display width to each respective column according to the relative priority and equal to a minimum width defined for the column and a portion of a slack,
        wherein the new display width assigned to each column does not exceed a maximum width previously defined for the respective column; and
    display the table on the browser using the display widths of the columns.

22. A system of claim 21, wherein the table width is determined by a size of a display on which the table is rendered.

23. A system of claim 21, wherein the table width is determined from a size of an application window in which the table is rendered.

24. A system of claim 23, wherein the processor is further configured to,
    repeat the method when the application window is resized.

25. A system of claim 21, wherein the table width is determined from a user input.

26. A system of claim 21, wherein the minimum width, the maximum width and the relative priority of each column is stored in a column properties database.

27. A system of claim 21, wherein the device is a personal computer.

28. A system of claim 21, wherein the device is a personal digital assistant.

29. A system of claim 21, wherein the device is a tablet computer.

30. A system of claim 21, wherein the device is a cellular phone.

31. The method of claim 21, wherein the slack is a difference between the sum of minimum widths and the table width.

* * * * *